(12) United States Patent
Lombacher et al.

(10) Patent No.: US 7,621,029 B2
(45) Date of Patent: Nov. 24, 2009

(54) MULTI-SPINDLE MACHINING CENTER

(75) Inventors: Tobias Lombacher, Heidenheim (DE); Stefan Hansch, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 0 days.

(21) Appl. No.: 12/287,758

(22) Filed: Oct. 14, 2008

(65) Prior Publication Data
US 2009/0123245 A1 May 14, 2009

(30) Foreign Application Priority Data
Nov. 14, 2007 (DE) .................. 10 2007 054 268

(51) Int. Cl.
B23Q 3/157 (2006.01)
B23P 23/00 (2006.01)
B23C 1/04 (2006.01)

(52) U.S. Cl. .................. 29/27 C; 483/18; 483/14; 408/53; 409/168; 409/160; 409/235; 409/167; 409/212; 409/192

(58) Field of Classification Search .................. 29/27 C, 29/27 R, 563, 33 P; 408/53, 42–43, 50, 71, 408/70, 234; 483/14–15, 18, 17; 409/235, 409/202, 212, 192, 203, 213, 217, 168, 167, 409/158, 159, 160, 163, 164, 197–198, 219, 409/224

See application file for complete search history.

(56) References Cited

U.S. PATENT DOCUMENTS 3,171,327 A  3/1965  Williamson
3,241,451 A  3/1966  Williamson
3,621,753 A  * 11/1971 Gladoske .................. 409/235

(Continued)

FOREIGN PATENT DOCUMENTS

DE  14 77 578 B2  8/1969

(Continued)

OTHER PUBLICATIONS

Germany Patent Office Examination Report dated Aug. 7, 2008 (4 pages).

*Primary Examiner*—Erica E Cadugan
(74) *Attorney, Agent, or Firm*—Flynn, Thiel, Boutell & Tanis, P.C.

(57) ABSTRACT

A multi-spindle machining center for the chip forming processing of workpieces comprises a spindle group having at least two spindles arranged in a spindle row adjacent to each other to mount a chip forming tool, and a workpiece support, on which at least two workpiece holders, correlated with the geometrical arrangement of the spindles, for holding workpieces for a simultaneous processing by means of the spindles, are arranged, the workpiece support having a beamlike longitudinal support member bearing the workpiece supports, and the spindles are guided for a movement toward the workpiece support in a first axial direction on a spindle linear guide arrangement. In the multi-spindle machining center there is a provision such that for positioning the workpieces in relation to the spindles workpiece support is guided on a workpiece support linear guide arrangement in a second axial direction running athwart the first axial direction and wherein the workpiece support is able to be shifted on the workpiece support linear guide arrangement in a servicing area arranged above or below the a working region of the spindles 12.

20 Claims, 5 Drawing Sheets

U.S. PATENT DOCUMENTS

| | | | |
|---|---|---|---|
| 5,245,792 A * | 9/1993 | Liechti et al. | 483/33 |
| 6,394,892 B2 | 5/2002 | Hanisch et al. | |
| 6,623,219 B2 * | 9/2003 | Nagasawa et al. | 409/212 |
| 6,865,788 B2 * | 3/2005 | Pasquetto | 29/38 B |
| 7,179,030 B2 | 2/2007 | Krosta et al. | |
| 2002/0006764 A1 | 1/2002 | Hanisch et al. | |
| 2004/0110614 A1 | 6/2004 | Hessbruggen et al. | |
| 2004/0132595 A1 * | 7/2004 | Grob | 483/30 |
| 2006/0048361 A1 * | 3/2006 | Corbean et al. | 29/27 C |
| 2006/0188352 A1 | 8/2006 | Krosta et al. | |
| 2008/0175684 A1 * | 7/2008 | Schmidt et al. | 409/219 |
| 2009/0124474 A1 * | 5/2009 | Lombacher et al. | 483/46 |

FOREIGN PATENT DOCUMENTS

| | | |
|---|---|---|
| DE | 100 29 967 B4 | 1/2002 |
| DE | 20118456 U1 * | 3/2002 |
| DE | 102 57 533 A1 | 7/2004 |
| DE | 103 30 909 A1 | 2/2005 |
| DE | 10 2005 057 658 A1 | 6/2007 |
| EP | 1 695 791 A1 | 8/2006 |

* cited by examiner

EMBODIMENT WHEREIN THE SPINDLES ARE INDIVIDUALLY SHIFTABLE IN THE FIRST AXIAL DIRECTION.

Fig. 6

MULTI-SPINDLE MACHINING CENTER

The invention relates to a multi-spindle machining center for the chip forming processing of workpieces comprising a spindle group having at least two spindles arranged in a spindle row adjacent to each other to mount a chip forming tool, and a workpiece support, on which at least two workpiece holders, correlated with the geometrical arrangement of the spindles, for holding workpieces for a simultaneous processing by means of the spindles, are arranged, the workpiece support having a beam-like longitudinal support member bearing the workpiece supports, and the spindles are guided for a movement toward the workpiece support in a first axial direction on a spindle linear guide arrangement.

Such a multi-spindle machining center is for example described in the European patent application 1 695 791. The workpiece holder is placed in front of the spindles and may for example be turned. The spindles are then shifted with the aid of a carriage arrangement in relation to the workpiece holder. However a comparatively large overall space is necessary for the arrangement of the workpiece support.

Accordingly one object of the present invention is to provide a compact multi-spindle machining center.

In order to attain this aim in the case of a multi-spindle machining center of the type initially mentioned there is a provision such that for positioning the workpieces in relation to the spindles the workpiece support is guided on a workpiece support linear guide arrangement in a second axial direction running athwart the first axial direction and that the workpiece support is able to be shifted on the workpiece support linear guide arrangement in a servicing area arranged above or below a working region of the spindles.

A basic thought of the invention is that the workpiece support has its servicing space above or below the working region of the spindles. Thus for example the workpieces may be changed here. However as well for the servicing of the spindles, for example for tool changing it is advantageous if the workpiece support is able to be shifted upward out of the spindle operating region into the servicing area.

The servicing area is preferably located within a machining space of the multi-spindle machining center. The servicing area is preferably within a machine cover or cladding arrangement and preferably within an operating cabin.

The workpiece support is preferably stationarily located in relation to the first axial direction. The first axial direction, which preferably extends in a horizontal direction, is as it were the feed direction of the spindles. The spindle group is however preferably stationary as related to the second axial direction, where feed is caused by the workpiece support. Accordingly the workpiece support bears the workpieces during chip forming machining by the spindles, which are moved in the first axial direction athwart the workpiece support, in a stable manner.

The spindle row can, but does not have to be, arranged along a straight line. For example it may also be arranged along an circularly arcuate or zig-zag line.

The servicing area is preferably provided for a workpiece change. The multi-spindle machining center preferably possesses a holder for a workpiece changer means, which is associated with the servicing area. It will be clear that the multi-spindle machining center may also possess a workpiece changer means as an integral component. The workpiece changer means will for example comprise a robot or a portal loader. The workpiece changer means, f. i. the portal loader only requires quite a small loading stroke to change the workpieces at the ready in the servicing area, for example to fit the workpiece support with workpieces yet to be machined or to remove already processed workpieces from the workpiece support.

The spindle group is able to be shifted on the spindle linear guide arrangement preferably into a movement space in the workpiece support, when the workpiece support has traveled into the servicing area. For example the spindle linear guide arrangement may have sufficiently long spindle linear guides. The spindles can therefore move separately or in groups into the movement space, which is necessary as such for axial movement of the workpiece support, where they are at the convenience of the machine operator and/or easily accessible for the machine operator. Furthermore a tool changer means, as for example a tool changing robot can have access to the spindles, which are for example shifted into the movement space forward for example.

The beam-like longitudinal support member may for example be placed in the middle or only on one side. Preferably it is however held at its terminal regions in a movable manner respectively on a workpiece support bearing means. This ensures a high degree of mechanical stability.

The workpiece support bearing means preferably comprises in each case a linear guide means of the workpiece support linear guide arrangement, which is guided in the second axial direction on a workpiece support linear guide.

The workpiece longitudinal support member is preferably rotatably supported for rotation about its longitudinal axis between a working position provided for machining by the spindle and a workpiece mounting position provided for workpiece changing. For example the workpiece support bearing means may comprise suitable rotary bearings at the longitudinal terminal regions. In principle however central or basically central rotary bearings would be quite possible too.

The spindle group will preferably comprise at least one spindle arranged in the second axial direction alongside the at least one spindle row. This spindle may constitute a component of a second or further spindle row or a single spindle by itself. The spindles are preferably arranged above each other.

For example the spindle group may have at least two spindle rows with spindles arranged alongside one another in a row arrangement. The spindle rows are arranged in the second axial direction adjacent to each other and for example placed over each other.

The workpiece support linear guide arrangements are preferably arranged on guide columns. The spindle group or furthermore the individual spindles are arranged between the guide columns. Accordingly the spindles may be shifted individually or in groups between the guide columns. The guide columns may for example stand upright in front of a machine bed, on which the at least one spindle is arranged in its spindle linear guide arrangement for guiding the spindle in the first axial direction. The guide columns preferably constitute components of a portal, which has a through opening for the spindles. A top transverse beam of the portal preferably constitutes a base or, respectively, a holder for the workpiece changer means. Furthermore the top transverse beam protects the spindle group lying underneath.

The workpiece support linear guides and the spindle group on the one hand and the workpiece support with the linear guide means are on the one hand preferably arranged on mutually facing sides. Therefore the workpiece support linear guide arrangements are arranged on the same side as the spindle group. Accordingly there is a compact structure of the design. The workpiece support is as it were able to be shifted in front of the spindle group, workpiece support linear guides, arranged alongside the spindle group, only occupying a small amount of space and in any case not in the axial direction, i. e. in the advance direction of the spindles.

The spindles may be able to travel separately or in groups in the first direction.

It is preferred for some of the spindles, for example all spindles of the spindle group or at least two spindles, to be arranged on a common spindle support, which is able to be shifted bodily in the first axial direction. The spindles are arranged fixedly or immovably on the spindle support. Accordingly there is a mechanically stable construction.

The spindle support may for example be designed as a spindle block and for example are placed before the front side. The tool sockets of the spindles are then arranged on this spindle block. The spindle block may form a twist resistant, mechanically loadable base for the individual spindles. Preferably the spindle block can travel bodily in the first axial direction.

The spindle support, and more especially the spindle block, may be arranged on a carriage, which is guided linearly in the first axial direction on a spindle linear guide arrangement. It is also possible for the spindle support or the spindle block to constitute the carriage or constitute one structural unit with the carriage. For example the spindle support may possess linear guide elements for guidance of the spindle linear guide arrangement.

The workpiece linear guides preferably extend to the side of the spindle group. For instance the spindle block may be supported for sliding motion between the workpiece support linear guides to allow sliding motion.

The workpiece support linear guides may for example comprise guide rail arrangements, on which the linear guide means, for example carriage elements or the like, of the workpiece support are linearly guided.

It is however in principle possible for one or more of the spindles to be guided separately from the other spindles in the first axial direction. Thus for example it is possible for one of the spindles to be guided for travel in the first axial direction on the spindle block or support separately, whereas the other spindles are stationary on the single support.

In the following working embodiments of the invention will be described with reference to the accompanying drawings.

FIG. 6 is a schematic of a further embodiment wherein the spindles are individually shiftable in the first axial direction.

Figure 1:
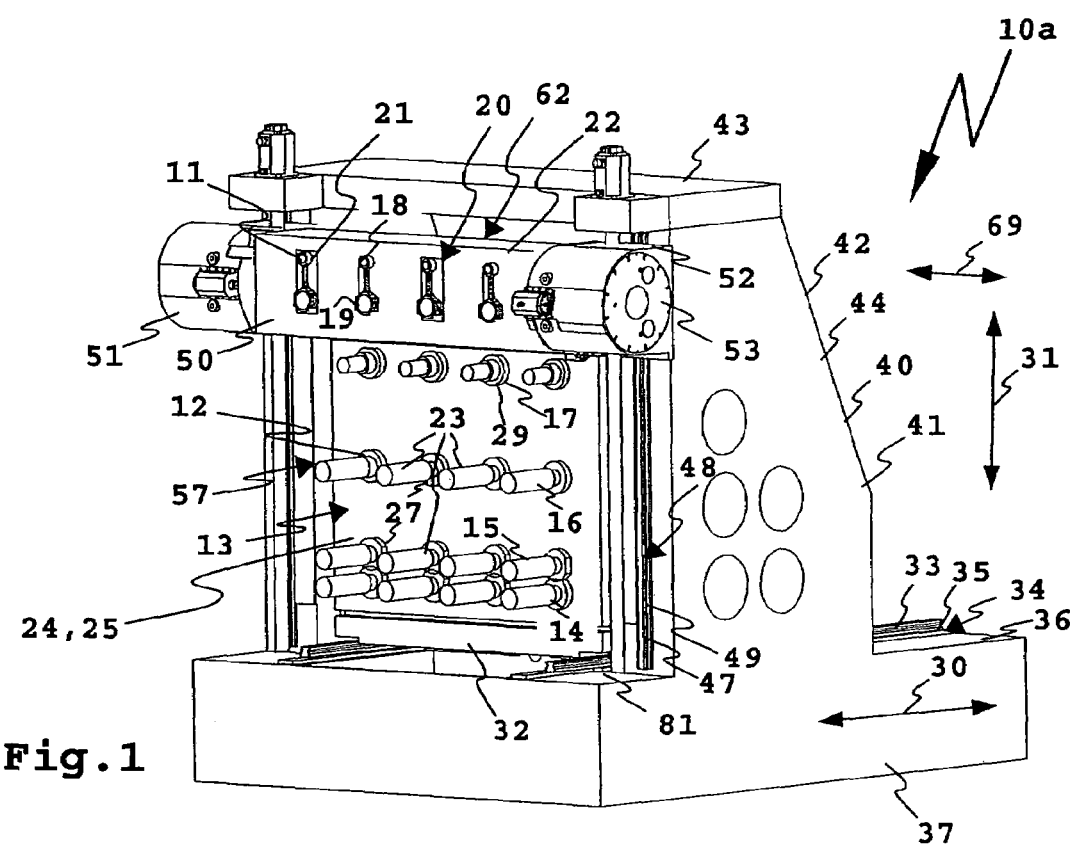
FIG. 1 is a view of a multi-spindle machining center from the front with a workpiece support shifted upward into a servicing area.
Figure 2:
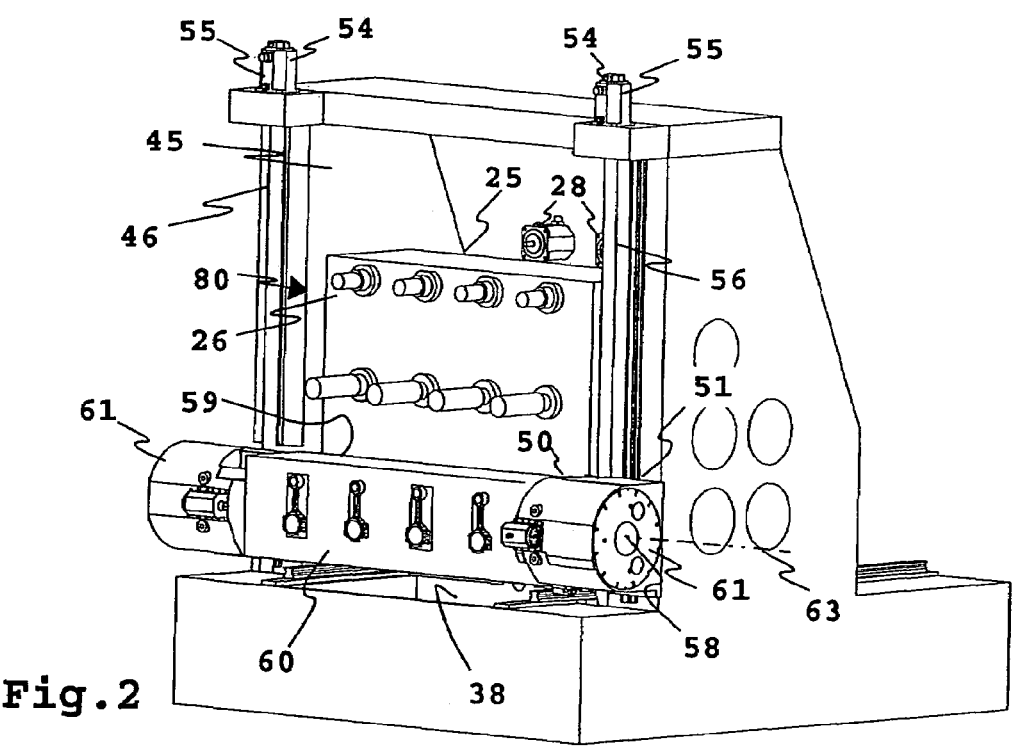
FIG. 2 shows the multi-spindle machining center in accordance with FIG. 1 with a workpiece support shifted down into a working region of the spindles for workpiece machining.

A multi-spindle machining center 10a serves for chip forming machining of workpieces 11, for example connecting rods for internal combustion engines. The multi-spindle machining center 10a comprises spindles 12, which are collected together as a single spindle group 13. Four spindles 12 are respectively placed in a spindle row 14 through 17. All in all a total of four spindle rows 14 through 16 are present, i. e. twelve spindles 12. The spindles 12 in the spindle rows 14 through 16 are in each case arranged horizontally in a straight line, although however an arcuate row arrangement, a row arrangement along a zig-zag line or the like would readily be possible. Furthermore more or less than 12 spindles and more or less than three spindle rows are possible.

Chip forming tools 23 are mounted on the spindles 12, as for example drilling and milling tools, lathe turning tools or the like. With the aid of the spindles 12 it is possible to machine several workpieces 11 at once. It is even possible for two spindle row 14 and 15 to be simultaneously active for machining a workpiece. For instance in each case two spindles 12 of the spindle rows 14 and 15 are grouped together in pairs on top of each other so that a small end or a big end 18 and 19 of the workpiece may be machined at once. Accordingly the spindle rows 14 and 15 could be termed a single spindle row having pairs of spindles in a row.

The spindle rows 14, 15 and 16 are respectively provided for different machining steps, for example drilling the two is ends 18 and 19 of the workpieces 11, chamfering the respective holes in the workpieces 11 or the like.

In parallelism to the spindle rows 14, 15 and 16, for example at the top a measurement means row 17 having measurement means 29 is arranged for the measurement of the workpiece 11, more particularly after and/or preceding machining by the spindles 12.

For offering and positioning the workpiece 11 in relation to the spindles 12 there is workpiece support 20 with workpiece holders 21 for holding the workpieces 11. The workpiece holders 21 each accept one workpiece 11 and they are arranged on a beam-like longitudinal support member 22, in a manner corresponding to the geometrical arrangement of the spindles 12, of the workpiece support 20. The longitudinal support member 22 extends horizontally in a manner corresponding to the horizontal arrangement of the spindles 12 in the spindle rows 14, 15 and 16. Accordingly workpieces 11 held and offered by the workpiece holders 21 may be respectively simultaneously machined by the spindles 12 in the spindle rows 14 and 15 and also 16.

For a compact structure and for mechanical stability of the machining center 10a the following measures are adopted.

It would admittedly in principle be possible to arrange the spindles 12 so as to be separately shifted along a straight line so that they could be individually shifted in the feed direction toward the workpieces 11 placed in position for machining. However in the case of the machining center 10a there is a mechanically twist resistant machine design principle for the workpieces 11 which are therefore worked with a high degree of accuracy. All spindles 12 are arranged stationarily jointly on a spindle support 24. The spindle support 24 accordingly holds all spindles 12. The spindle support 24 is designed in the form of a spindle block 25. The spindle block 25 comprises for example a sort of board or a parallelepiped for holding the spindles 12.

On the front side 26 of the spindle block 25 tool sockets 27 for the tools 23 are arranged. The spindles 12 are for example driven by spindle drives 28 preferably arranged at a back side or top side of the spindle block 25. At the rear side of the spindle block 25 the spindle drives 28 are protected against foreign matter from the surroundings such as chips, machining fluid or the like.

The spindle block 25 is able to be moved bodily in a first axial direction 30. The first axial direction 30 runs horizontally in the present case, for example in the Z direction. The workpiece support 20 on the contrary is able to be shifted athwart the first axial direction 30 in a second direction, in the present case vertically, for example in the Y direction. When the workpiece support 20 has positioned the workpieces in front of one of the spindle rows 14 through 16, the spindles 12 are shifted in the first axial direction 30. Following the respective workpiece processing, for example by drilling or milling, the spindles 12 travel back in the first horizontal axial direction 30 to the rear again, whereupon the workpiece support 20 positions the workpieces 11 vertically in relation to a further spindle row 14, 15 or 16 for further machining or for tool changing (to be explained later) above or below (see FIG. 3) the spindle group 13.

For horizontal positioning of the spindle group 13 there is a horizontal carriage 32, on which the spindle block 25 is disposed. In the alternative it would be possible for the spindle group to form an assembly unit with a horizontal carriage.

The horizontal carriage 32 is guided on the spindle linear guides 33 of a spindle linear guide arrangement 34 linearly along the first axial direction 30. The spindle linear guides 33 for example comprise spaced apart rails 35 extending in parallelism to each other on which the horizontal carriage 32 runs. The rails 35 are arranged on a top side 36 of a machine bed 37 of the machining center 10a.

Between the linear guides 33, on the machine bed 37, a chip removal space and/or a chip trap space 38 is provided for the disposal of chips, which are produced during workpiece machining by the spindles 12. The chips may fall directly downward into the chip trap space 38 whence they are removed by chip discarding means, not illustrated in detail, as for example a chip removal belt or the like, to the rear. Accordingly compact accommodation for the chip removal means is also possible.

On the top side 36 of the machine bed 37 the frame 40 of a machine rack 41 is disposed. The two lateral upwardly extending frame parts of the of the frame 40 constitute guide columns 42 on which the workpiece support 20 is guided vertically. The guide columns 42 are joined together at the top by a transverse beam 43 of the frame 40 so that the frame 40 constitutes a portal 44. The spindle group 13 may travel horizontally through the portal 44 forward to the workpieces 11 held at the ready by the workpiece support 20. The linear guides 33 or, respectively, rails 35 extend into a through opening 45 of the portal 44 and, as in the present case, preferably right the way through it.

The two guide columns 42 are, as considered in the transverse direction thereof, i. e. parallel to the first axial direction 30, best made at least so wide as the spindle block 25 is deep. This measure ensures that the frame 40 and accordingly the vertical guide of the workpiece support 20 have a substantial mechanical load carrying capacity. The transverse beam 43 makes a contribution here too, which joins the two guide columns 42 together.

On the front side 46 of the guide columns 42 workpiece support linear guides 47 of a workpiece support linear guide arrangement 48 are disposed for guiding the workpiece support 20 in the second axial direction 31. The workpiece support linear guides 47 comprise rails 49 for example which extend vertically. The front side 46 of the guide columns 42 and the front side 26 of the spindle block 25 extend in parallelism. The workpiece support 20 is arranged opposite to the two front sides 26 and 46 and holds the workpieces 1 for machining by the spindles 12 at the ready. The longitudinal support member 22 is borne in a movable fashion at its length terminal regions 50 respectively by a workpiece support bearing means 51. By means of the workpiece support bearing means 51 the longitudinal support member 22 is respectively terminally held, something which endows it with a substantial mechanical stability.

The bearing means 51 comprise linear guide means 52 linearly guided on the workpiece support linear guides 47. The linear guide means 52 for example fit around the rails 49. Accordingly the workpiece support 20 constitutes or includes a vertical carriage 53 for positioning the workpieces 11 in the second vertical axial direction 31. The vertical carriage 53 is driven by carriage drives 54. For this purpose for example linear direct drives or rack drives would be possible. In the working embodiment the carriage drives 54 however comprise rotary drives 55, which drive the vertical carriage 53 vertically via transmissions 56, as for example circulating ball drives. The rotary drives 55 are best disposed in the top region of the multi-spindle machining center 10a, for example on projections on the transverse beam 43 so that they are arranged outside a working zone 57 of the spindles 12.

The longitudinal support member 22 is furthermore supported in a rotatable manner on the workpiece support bearing means 51 by means of rotary bearings 58 for turning about its longitudinal axis 63. Accordingly the longitudinal support member 22 may be rotated into a working position 59 in which the workpieces 11 are placed opposite the spindles 12 for machining or in a reloading position 60, in which the workpieces 11 can be removed from the workpiece support 20 and rearranged on it.

Figure 4:
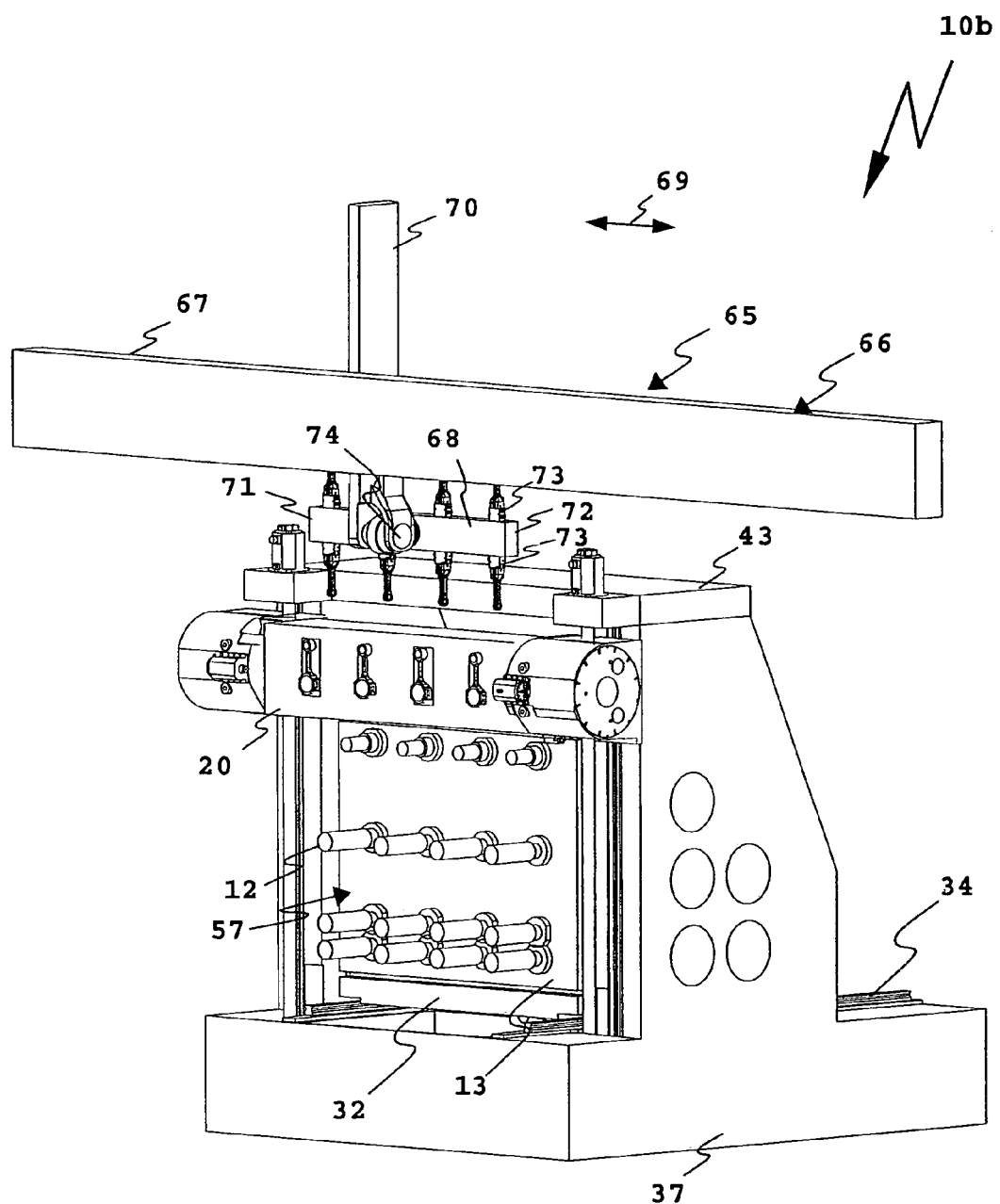
FIG. 4 is a perspective lateral elevation of a first modified form of the machining center in according to FIG. 1 with a portal loader as a workpiece changer means for a tool change.

It is possible for the longitudinal support member 22 to be arranged for turning through 180 or 360 degrees. Rotation through less than 360 degrees, as for example only 90 degrees, f. i. upward and toward the spindles 12, would also be sufficient, as will become clear in connection with the working embodiments in accordance with FIGS. 4 and 5.

The rotary bearings 58 also render possible turning of the longitudinal support member 22 or, respectively, of the workpieces 11 near to or between chip forming working steps. Thus for example by indexing or turning the workpieces 11 holes may be drilled in different axial direction, which are at an angle to one another.

For rotation of the longitudinal support member 22 rotary drives 61 are provided for the workpiece support bearing means 51. As a matter of principle however a single rotary drive 61 suffices for the rotation of the longitudinal support member 22.

With the aid of the carriage drives 54 and the workpiece support bearing means 51 the workpiece support 20 can be shifted vertically within the working region 57 for machining by the spindles 12. The workpiece support linear guide arrangement 48 however also renders it possible to shift the workpiece support 20 out of the working region 57 upward into a servicing area 62 above the spindle group 13. An alternatively indicated workpiece support linear guide arrangement 48' makes it possible to move the workpiece support 20 downward (FIG. 3) into a servicing area 62' underneath the spindle group 13.

A positioning of the workpiece support 20 in the servicing area 62 leads to two advantageous features, namely convenient workpiece changing and ready access to the spindles 12.

In the servicing area 62 the workpiece support 20 is available for changing the workpieces 11, for example for a workpiece changer means 65. Furthermore the tool sockets 27 for the spindles 12 are readily accessible so that servicing operations, as for example tool changing or the like are readily performed.

In the case of a machining center in accordance with the invention it is namely advantageous if the workpiece support, in the present case the workpiece support 20, can be completely withdrawn from the working region 57 and moved into the servicing area 62 so that all spindles 12 are accessible from the front. When in the case of a particular the workpiece support is positioned in its servicing position 62 it is then preferably moved clear of the respective working region of the spindles completely so that the spindles are conveniently accessible, for example for a tool changer. This is also the case with the machining center 10a. In its servicing position the longitudinal support member 22 extends along above the spindle block 25 so that the latter is freely accessible from the front.

The workpiece changer means 65 comprises for example a portal loader 66, which is disposed above a machining center 10b. The multi-spindle machining center 10b is in principle similar to the multi-spindle machining center 10c, the workpiece changer means 65 preferably constituting a component of the machining center 10b. The loading portal 66 includes a horizontal guide 67 for a workpiece carrier 68. The horizontal guide 67 runs for example in parallelism to the spindle rows 14 through 16 in a third axial direction 69, i. e. athwart the axial directions 30 and 31. Furthermore the workpiece carrier 68 is able to be vertically set on a vertical guide 70 to place workpieces 11 on the workpiece carrier 20 and, respectively, to doff them.

The workpiece changer means 65 preferably comprises a workpiece support 71 for simultaneously holding several workpieces 11 correlating with the arrangement of the workpiece supports 21 on the longitudinal support member 22 so that using the workpiece support 71 several as yet unprocessed workpieces 11 may be simultaneously arranged on the workpiece support 20 and removed from it when machined. For this purpose on a longitudinal support member 72 of the workpiece support 71 on opposite sides there are respectively four workpiece sockets 73 placed adjacent to each other in a row direction. The workpiece support 71 is supported in a rotatable manner using a rotary bearing 74 in order to turn the workpiece sockets 73 toward the workpiece support 20 or away from it.

The vertical stroke of the workpiece socket 68 may conveniently be a short one, because the servicing area 62 is disposed in the top region of the multi-spindle machining center 10b. The workpiece changer means 65 does therefore not have to be shifted down, for example into the region with the spindle rows 14 and 15, in order to change the workpieces 11.

Figure 5:
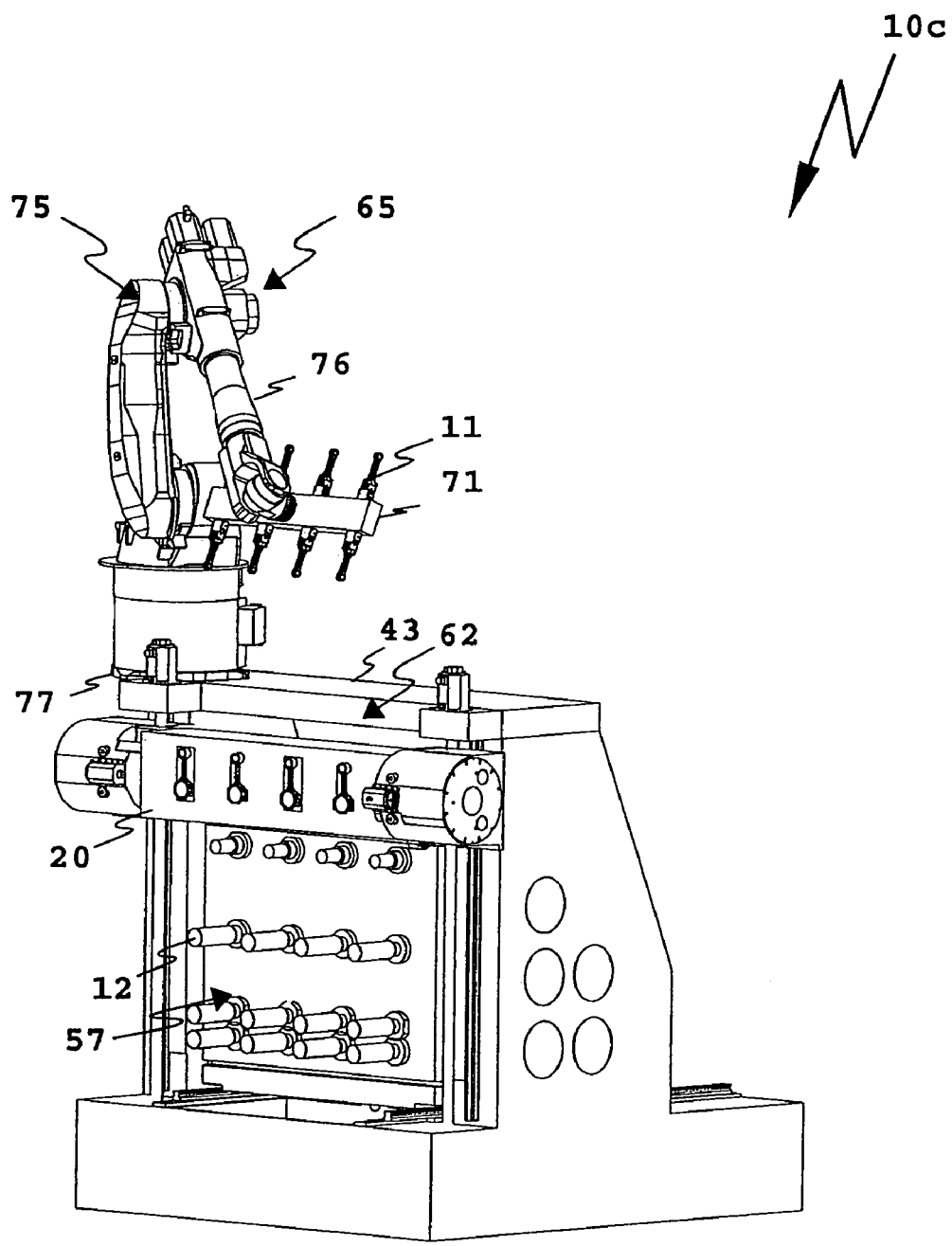
FIG. 5 illustrates a second modified form of the multi-spindle machining center in accordance with FIG. 1 with a robot as the workpiece changer means.

In the case of a multi-spindle machining center 10c in accordance with FIG. 5 a robot 75 is provided as a workpiece changer means 65, which is assigned to the servicing area 62. In comparison with the loading portal 66 the robot 75 has more degrees of freedom for movement. In the case of the robot 75 too it is an advantage, like with the loading portal 66, if a workpiece support 71 with workpiece sockets 73 is provided so that simultaneously workpieces 11 may be removed from the workpiece support 20 and respectively arranged on it. The workpiece support 71 is placed on robot arm 76 in a rotatable or indexable fashion.

The top transverse beam 43 of the frame 40 constitutes or includes a holder 77 for the robot 75.

Servicing of the multi-spindle machining center 10a, b and c is also facilitated because, when the workpiece support 20 is shifted into the servicing area 62, there is a space 80 left free for movement for chip forming machining by the spindles 12. The linear guide arrangement 34 is preferably so designed that the spindle block 25 is able to be shifted into the movement space 80, for example for servicing purposes. Then the two front sides 26 and 46 of the spindle block 25 and, respectively, of the guide columns 12 are in line. At least the spindle block's front side 26 is preferably able to be positioned adjacent to the front side 46 of the guide columns. Preferably the front side 26 is able to be positioned in front of the front side 46 of the guide columns 42. An operator or a tool changer does therefore not have to reach into the intermediate space between the two guide columns 42 to, for example, change tools 23.

The workpiece support linear guides 47 preferably extend in a forward direction toward the workpiece support 20 past the guide columns 42 to a front portion 81 of the machine bed 37.

The extent of the front portion 81 in the depth or respectively length direction is approximately equal to the depth of the workpiece support 20 in the first axial direction 30. In other words the workpiece supports and the front protruding portion 81 of the machine bed 37 only project a small distance in the first axial direction 30 in front of the guide columns 42. Accordingly the machining centers 10a, 10b and 10c are quite compact.

The compact manner of construction is also possible because the workpiece changer means 65 are above the machining centers 10a-10b. In the horizontal direction, i. e. both in the first axial direction 30 and also in the third axial direction 69 only a small amount of space is required. The machining centers 10a through 10b only require a small floor area to stand on.

Figure 3:
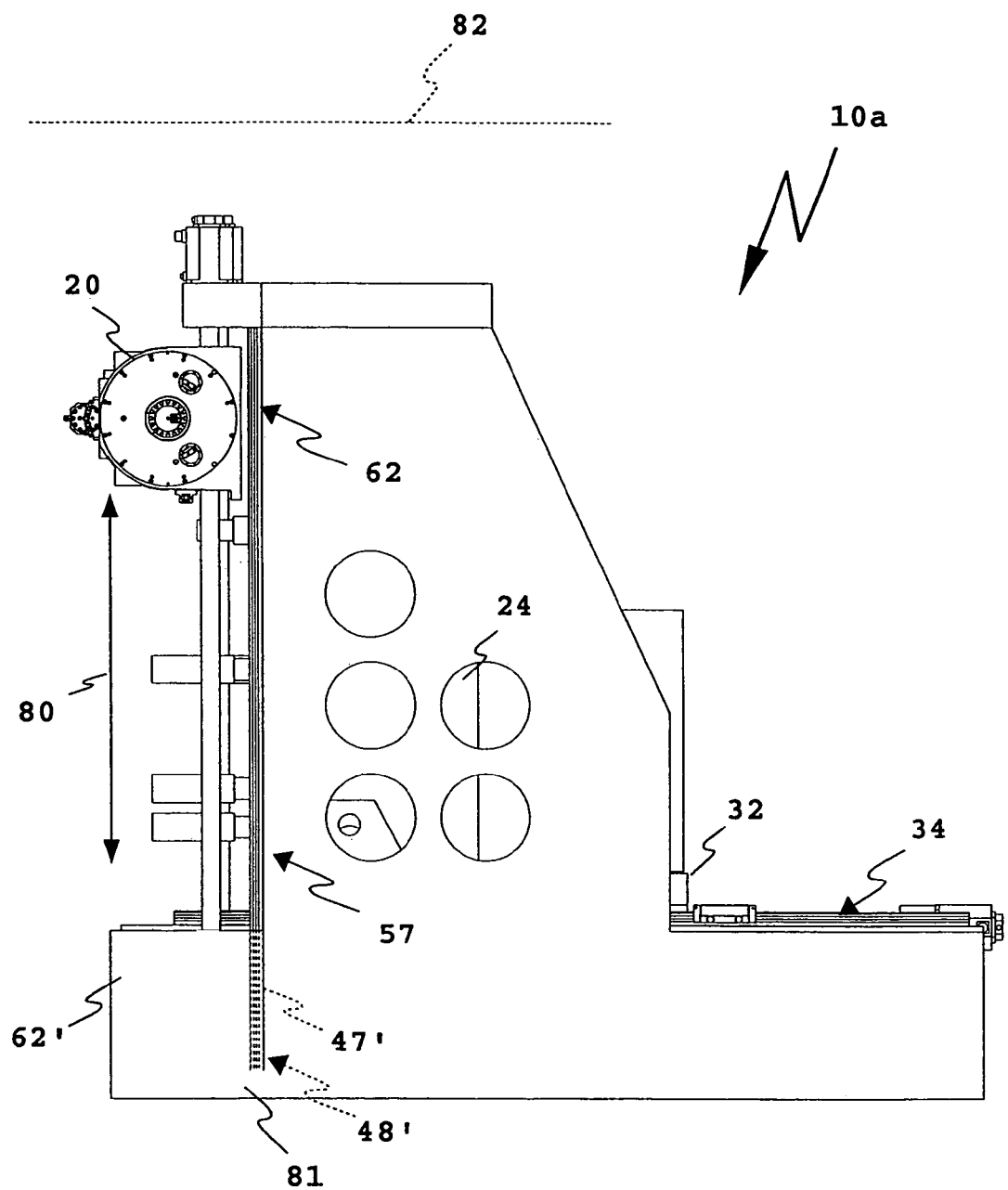
FIG. 3 is a lateral elevation of the multi-spindle machining center in accordance with FIG. 1.

If in the case of a design of a multi-spindle machining center in accordance with the invention, which is not illustrated, there is sufficient space underneath the respective spindle group, f. i. at a position, where in the case of the machining center 10a the protruding portion 81 is located, it is possible to provide a servicing space for the workpiece support, for example in a region 62' illustrated in FIG. 3. The machine bed can then be shorter for example or possess a accommodating space, whereas the workpiece support linear guides 47' are extended into the servicing space 62' for example.

The servicing area 62 is preferably arranged inside a machine cover 82 as indicated.

The invention claimed is:

1. A multi-spindle machining center for the chip forming processing of workpieces comprising
   a spindle group having at least two spindles arranged in a spindle row adjacent to each other to mount a chip forming tool, and
   a workpiece support, on which at least two workpiece holders, correlated with the geometrical arrangement of the spindles, for holding workpieces for a simultaneous processing by means of the spindles, are arranged,
   the workpiece support having a beam-like longitudinal support member bearing the workpiece holders, and the spindles are guided for a movement toward the workpiece support in a first axial direction on a spindle linear guide arrangement, wherein for positioning the workpieces in relation to the spindles, the workpiece support is guided on a workpiece support linear guide arrangement in a second axial direction running athwart the first axial direction and wherein the workpiece support is able to be shifted on the workpiece support linear guide arrangement to a servicing area arranged above a working region of the spindles, wherein the workpiece support linear guide arrangement includes workpiece support linear guides, each arranged on a guide column of a portal, and wherein located above the portal is a workpiece changer for exchanging a workpiece from the workpiece support when the workpiece support is in the servicing area.

2. The multi-spindle machining center in accordance with claim 1, characterized in that the servicing area is provided for enabling tool changing.

3. The multi-spindle machining center in accordance with claim 1, wherein the spindle group is able to be shifted on the spindle linear guide arrangement into a movement space of the workpiece support, when the workpiece support has been moved into the servicing area.

4. The multi-spindle machining center in accordance with claim 1, wherein the beam-like longitudinal support member of the workpiece support is held in a moving manner at each of its length terminal regions on one respective workpiece support bearing means.

5. The multi-spindle machining center in accordance with claim 4, wherein the workpiece support bearing means at the longitudinal terminal regions of the longitudinal support member comprises in each case a linear guide means of the workpiece support linear guide arrangement, which linear guide means is guided on a respective workpiece support linear guide in the second axial direction.

6. The multi-spindle machining center in accordance with claim 5, wherein the workpiece support linear guides and the spindle group on the one hand and the workpiece support with the linear guide means on the other hand are disposed on mutually facing sides.

7. The multi-spindle machining center in accordance with claim 5, wherein the workpiece support linear guides extend along the side of the spindle group.

8. The multi-spindle machining center in accordance with claim 1, wherein the workpiece support is able to be shifted on the workpiece support linear guide arrangement to a servicing area arranged below the working region of the spindles.

9. The multi-spindle machining center in accordance with claim 1, wherein the spindle group is placed between the guide columns.

10. The multi-spindle machining center in accordance with claim 1, wherein the guide columns project above and at a front of a machine bed, on which bed the spindle linear guide arrangement is arranged for guiding the spindles in the first axial direction.

11. The multi-spindle machining center in accordance with claim 1, wherein the portal has a through opening for the spindles.

12. The multi-spindle machining center in accordance with claim 1, wherein the workpiece longitudinal support member is rotatably supported for turning between a working position for enabling machining using the spindles and a loading position provided for enabling a tool change.

13. The multi-spindle machining center in accordance with claim 1, wherein the spindle group comprises at least one spindle spaced in the second axial direction from the at least one spindle row.

14. The multi-spindle machining center in accordance with claim 1, wherein the spindle group includes at least two spindle rows with spindles arranged adjacent to each other in a row direction and wherein the at least two spindle rows are arranged adjacent to one another and spaced from one another in the second axial direction.

15. The multi-spindle machining center in accordance with claim 1, wherein the spindles singly or in groups are able to travel in the first axial direction.

16. The multi-spindle machining center in accordance with claim 15, wherein at least one of the spindles is guided separately from the other spindle or spindles in the first axial direction.

17. The multi-spindle machining center in accordance with claim 15, wherein the spindles of the spindle group are arranged on one spindle support, which is able to be bodily shifted in the first axial direction.

18. The multi-spindle machining center in accordance with claim 17, wherein the spindle support is designed in the form of a spindle block.

19. The multi-spindle machining center in accordance with claim 1, wherein the first axial direction extends horizontally and the second axial direction extends vertically.

20. The multi-spindle machining center in accordance with claim 1, wherein the servicing area is arranged within a machine cover.

* * * * *